March 25, 1958     E. L. MIDGLEY     2,828,049
LIQUID FEEDING APPARATUS
Filed Dec. 28, 1956     2 Sheets-Sheet 1
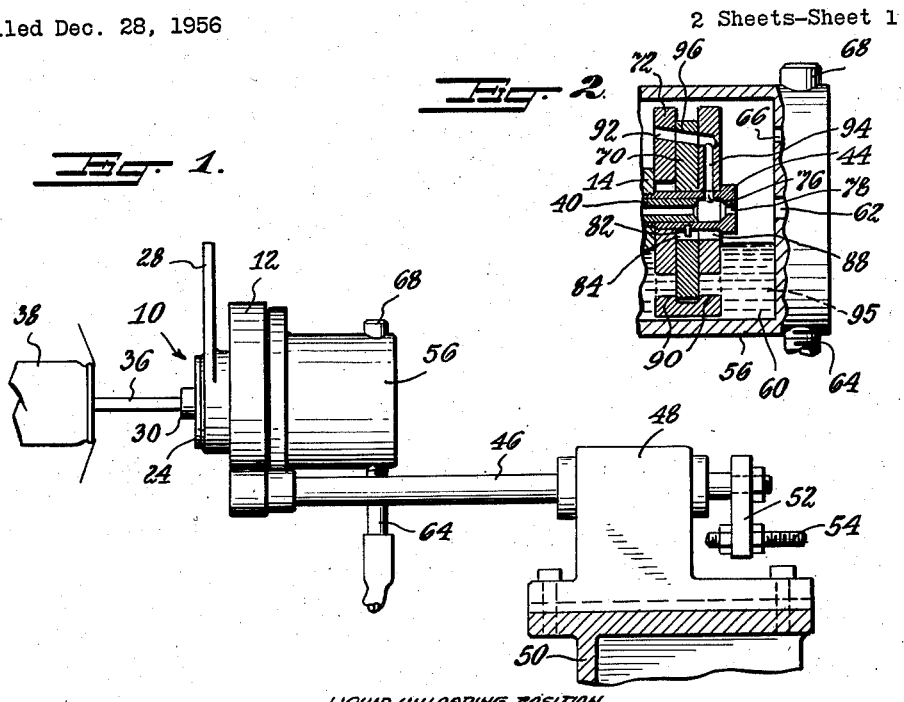
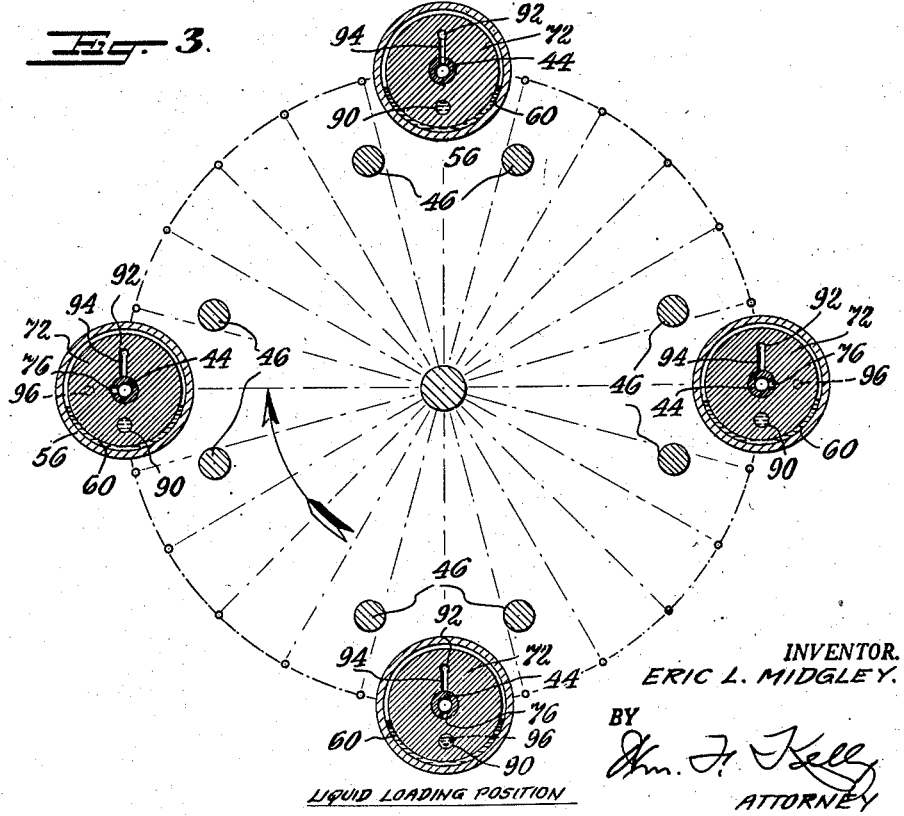
INVENTOR.
ERIC L. MIDGLEY.
BY
ATTORNEY March 25, 1958 — E. L. MIDGLEY — 2,828,049
LIQUID FEEDING APPARATUS
Filed Dec. 28, 1956 — 2 Sheets-Sheet 2
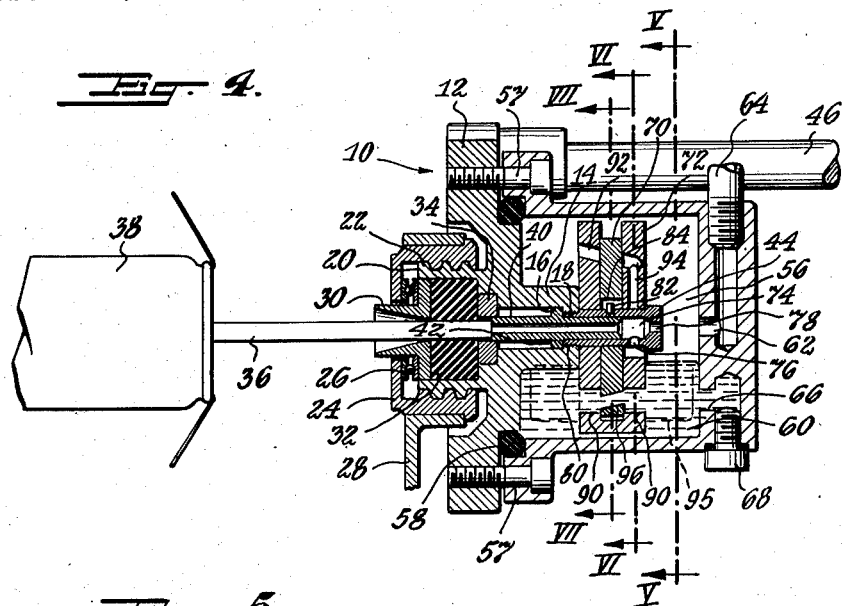
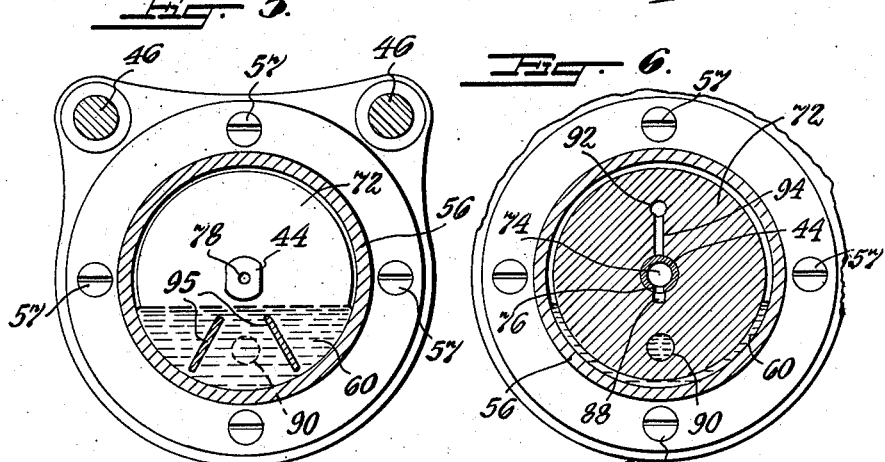
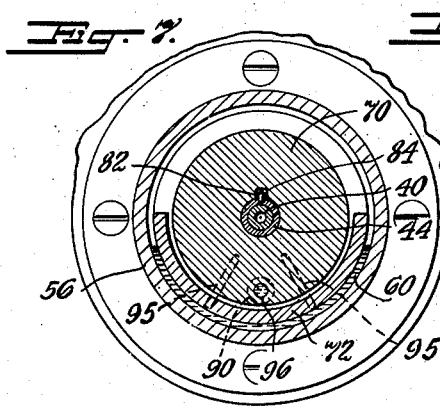
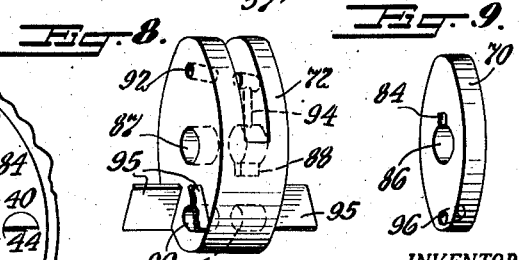
INVENTOR.
ERIC L. MIDGLEY.
BY
ATTORNEY United States Patent Office 2,828,049
Patented Mar. 25, 1958

2,828,049

LIQUID FEEDING APPARATUS

Eric L. Midgley, Salem, Mass., assignor to Westinghouse Electric Corporation, East Pittsburgh, Pa., a corporation of Pennsylvania Application December 28, 1956, Serial No. 631,236

8 Claims. (Cl. 222—4)

The present invention relates to a machine for the horizontal exhaust of low pressure discharge lamps and, more particularly, to a liquid feeding apparatus for such a machine.

Heretofore, horizontal exhaust machines, such as disclosed and shown in U. S. Patent No. 2,726,799, issued December 13, 1955, to E. H. Dodge et al. have liquid dispensing devices, such as shown in U. S. Patent No. 2,699,279, issued January 11, 1955, to E. H. Dodge et al. carried by each head on the continuously rotating conveyor. Liquid dispensers of this type employ a sleeve which is rigidly mounted in one wall of a liquid reservoir and is provided with a metering orifice therein, and a bucket limitedly rotatably mounted on the sleeve and pinned to a sleeve valve within the sleeve. The bucket is adapted to move into and out of the liquid to pick up a quantity of liquid in excess of the amount required to fill the metering orifice in the sleeve. At the desired time the bucket shears off the metered quantity of liquid in the metering orifice and aligns a delivery orifice in the sleeve valve with the metering orifice to deliver the metered liquid to a chamber in alignment with the discharge device to be charged.

Due to the small diameters of the delivery orifice in the sleeve valve and the metering orifice in the fixed sleeve, these orifices often become clogged with dirt or other deleterious material and must be periodically cleaned. This cleaning operation requires the complete dismantling of the liquid dispenser from the exhaust head and results in considerable expense and delay. Further, owing to the large number of moving parts, namely the sleeve valve, the fixed sleeve and bucket considerable wear is involved in the operation of the conventional liquid dispensers. In addition, the vibration of the continuously moving exhaust machine often causes dirt to become wedged between the bucket and the fixed sleeve, thus preventing the bucket from rotating limitedly on the fixed sleeve to shear off the metered quantity of liquid and to align the delivery orifice with the metering orifice.

The present invention contemplates the provision of a liquid feeding apparatus comprising a reservoir, a stationary mounting member removably mounted in said reservoir, a metering member fixed on the mounting member and provided with a metering orifice which is movable into and out of the liquid to receive a measured quantity thereof, and a retaining member rotatably mounted on the mounting member and provided with intake orifices and a feeding orifice. The metering orifice of the metering member is adapted during the movement of the conveyor of the exhaust machine to move into registry with the intake orifices to receive a measured charge of liquid and later to move into registry with the feeding orifice to deliver said measured charge of liquid to a receiving chamber.

It is accordingly the general object of the invention to provide liquid feeding apparatus having a limited number of moving parts therein to thus reduce the maintenance required and the wear in, and increase the life of, the liquid feeding apparatus.

A specific object is a liquid feeding apparatus which may be readily removed from a head of an exhaust machine, disassembled and cleaned.

A further object is a liquid feeding apparatus which provides positive alignment of the metering orifice and the feeding orifice.

Still further objects of the present invention will become apparent to those skilled in the art by reference to the accompanying drawings in which Fig. 1 is a side elevational view of an exhaust head of a horizontal exhaust machine, which head carries the liquid feeding apparatus and is shown in the liquid unloading position.

Fig. 2 is an enlarged fragmentary vertical sectional view of the liquid feeding apparatus in the liquid unloading position and showing the readily removable stationary mounting member, the metering member and the counterweighted finned retaining member.

Fig. 3 is a vertical sectional view of the liquid feeding apparatus in four of the operating positions along its path of movement around the periphery of the rotating conveyor of the horizontal exhaust machine.

Fig. 4 is an enlarged vertical sectional view of the liquid feeding apparatus in the liquid loading positon of Fig. 3.

Fig. 5 is a vertical sectional view of the liquid feeding apparatus along the line V—V of Fig. 4 in the direction of the arrows and showing the fins of the counterweighted retaining member.

Fig. 6 is a vertical sectional view, similar to Fig. 5, along the line VI—VI of Fig. 4 in the direction of the arrows and showing the metering member and a portion of the retaining member.

Fig. 7 is a vertical sectional view, similar to Figs. 5 and 6, along the line VII—VII of Fig. 4 in the direction of the arrows and showing the means for connecting the metering member to the mounting member.

Fig. 8 is a perspective view of the retaining member with a portion of one of the fins broken away to more clearly show the liquid inlet holes therein.

Fig. 9 is a perspective view of the metering member.

Although the principles of the invention are broadly applicable to the feeding of a measured charge of any liquid, the invention is usually employed for charging a discharge device, such as a fluorescent lamp, with a predetermined amount of mercury and hence it has so been illustrated and will be so described.

With specific reference to the form of the invention illustrated in the drawings an exhaust head or compression rubber assembly 10, such as shown in U. S. Patent No. 2,254,905, issued September 2, 1941, to Daniel Mullan, is shown in Figs. 1 and 4. Since this compression rubber assembly 10, per se, forms no part of this invention it is sufficient to say that the compression rubber assembly 10 has a flanged body 12 provided with a right hand boss 14, as viewed in Fig. 4, which boss has an internal shoulder 16 and an internally threaded portion 18. The body 12 also has a left hand boss 20 having an externally threaded portion 22 in engagement with an operating cap 24. Clockwise rotation, as viewed in Fig. 4, of the cap 24 on a ball bearing 26 by means of an operating handle 28 moves a tubulation guide 30 inwardly against a compression rubber 32 to compress the rubber 32 against the body 12 and a tubulation receiving collar 34 and about a tubulation 36 of a discharge device 38 of the low pressure positive column type, such as a fluorescent lamp. To provide a stop for the tubulation 36 during the movement of the compression rubber assembly 10 to the left, as viewed in Figs. 1, 4 to receive the tubulation 36, a flanged sleeve 40 has its left hand shank portion slidably supported by the right hand end, of the collar 34 and its middle flanged portion 42 slidable in the bore of the boss 14 and, as shown in Fig. 4, normally resting against the shoulder 16. The sleeve 40 is slidable to the left, as viewed in Figs. 2, 4 to eject the cullet portion of the tubulation 36 from the compression rubber assembly 10 after the tip-off of the exhausted discharge device 38. For the purpose of transferring the measured charge of liquid from a mounting member 44 of the liquid feeding apparatus to the tubulation 36, this fixed sleeve 40 extends beyond the boss 14 of the body 12.

While various means may be utilized to mount the compression rubber assembly 10, the form of the invention illustrated employs a pair of longitudinal mount rods 46 (Figs. 1, 3, 4 and 5) which are secured to the flanged portions of the body 12 and are reciprocable in suitable bearings 48 (Fig. 1), which bearings 48 are affixed to the periphery of a continuously rotating conveyor 50 of a horizontal exhaust machine, of the type shown in U. S. Patent No. 2,726,799, issued December 13, 1955, to E. H. Dodge et al. To provide reciprocating means for these rods 46, each of the mount rods 46 is connected by an arm 52 to an operating rod 54 which is reciprocable by conventional means such as a lever (not shown) in engagement with a cam (not shown) on the main cam shaft (not shown) of the exhaust machine.

As shown in Figs. 1, 4 and 5, the liquid feeding apparatus has a reservoir 56 secured by a plurality of bolts 57, for example four are shown in Fig. 5, to the flanged portion of the body 12. A resilient ring gasket 58 between the reservoir 56 and the body 12 secures a quantity of liquid, such as mercury 60, therein. This reservoir 56 is provided with a gas inlet aperture 62 connected by a gas line 64 to a suitable inert gas supply, such as argon (not shown), and a liquid filling aperture 66 sealed by a threaded fill cap 68.

The mounting member 44 (Figs. 2-7) is employed to fixedly mount thereon a metering member 70 and rotatably support thereon a retaining member 72. The member 44 is provided with a receiving chamber 74 which chamber 74 opens into the adjacent hollow portion of the sleeve 40. This receiving chamber 74 is communicable with the outer periphery of the mounting member 44 by means of a delivery orifice 76 and has a gas inlet orifice 78 in registry with the outlet end of the aperture 62. As a means of fixedly securing the mounting member 44 to the body 12 a threaded left hand portion 80, as viewed in Fig. 4, of the mounting member 44 is normally in fixed engagement with the threaded portion 18 of the boss 14 of the body 12. To secure the metering member 70 to the mounting member 44 a pin 82, projecting radially from the periphery of the mounting member 44, engages a radial slot 84 (Fig. 9) provided in a center mounting hole 86 of the metering member 70.

To counterweight the lower portion of the retaining member 72 and to permit the insertion of the metering member 70 therein, the retaining member 72 (Figs. 2, 4, 5-8) is handily a hollow disc having an annularly slotted bottom portion, as viewed in Fig. 8, and a bifurcated upper portion. This retaining member 72 is provided with a center mounting hole 87, the right hand portion, as viewed in Fig. 8, of which has a clearance slot 88 for the insertion and withdrawal of the pin 82; a pair of registering inlet orifices 90 in the lower portion, as viewed in Figs. 4, 8 thereof; a downwardly inclined venting orifice 92 located in the left hand bifurcation of the member 72, diametrically opposite to the inlet orifices 90; and a feeding orifice 94 located in the right hand bifurcation of the member 72 in inclined registry with the venting orifice 92 and movable into registry with the delivery orifice 76 in the mounting member 44. To further assure the maintenance of the inlet orifice 90 of the counterweighted retaining member 72 in the "down" position shown in Figs. 2-7, the retaining member 72 has stabilizing fins 95, disposed about the inlet orifices 90 and projecting from the outer faces, as viewed in Fig. 8, of the retaining member.

The metering member 70 (Figs. 2, 4, 7 and 9) is a solid disc having, in addition to the center mounting hole 86 and the pin engaging slot 84, an upwardly inclined metering orifice 96, as viewed in Figs. 4, 9, for receiving the desired amount of mercury 60 through the inlet orifices 90 in the retaining member 72 when said members 70, 72 are in the loading position shown in Figs. 3, 4. During the clockwise movement, as viewed in Fig. 3, of the conveyor 50, the metering orifice 96 in the metering member 70 and the delivery orifice 76 in the mounting member 44 always remain aligned with each other on an extension of a radius of the conveyor 50.

One of the features of the liquid feeding apparatus is the ease with which the liquid feeding apparatus may be disassembled for cleaning or maintenance purposes. Preparatory to the removal of the reservoir 56 from the compression rubber assembly 10, the operator stops the conveyor 50 when the assembly 10 is in the position shown in Fig. 4, removes the threaded fill cap 68 from the reservoir 56 and permits the mercury 60 to flow out of the aperture 66 in the reservoir 56. The operator then removes the bolts 57 from the flanged portion of the body 12 and removes the reservoir 56 from the compression rubber assembly 10. Counterclockwise rotation, as viewed in Fig. 4, of the mounting member 44 disengages the member 44 from the threaded portion 18 of the boss 14 of the body 12. While holding the retaining member 72 in one hand the operator then aligns the slot 84 in the mounting member 44 and the slot 88 in the retaining member 72 and moves the member 44 to the right, as viewed in Fig. 2, to remove the pin 82 from the slots 84, 88 and to withdraw the member 44 from the members 70, 72. The metering member 70 may then be withdrawn from the slotted bottom portion, as viewed in Fig. 8, of the retaining member 72 for the individual cleaning of the members 70, 72.

After cleaning, the conveyor 50 is moved to the liquid unloading position of Fig. 3, the metering member 70, retaining member 72 and mounting member 44 are reassembled, the mounting member reinserted in the body 12, the reservoir 56 secured to the body 12, and the reservoir 56 charged with mercury 60 and sealed by a reversal of the above described procedure.

When the liquid feeding apparatus is in the liquid loading position, shown in Figs. 3, 4, 5, 6 and 7, the metering orifice 96 in the metering member 70 is in registry with the inlet orifices 90 in the retaining member 72 and a metered amount of mercury 60 is received within the metering orifice 96. As the conveyor 50 moves in a clockwise direction, as viewed in Fig. 3, the counterweighted finned retaining member, rotates on the mounting member 44, with respect to the metering member 70 fixed to the member 44. During this rotation the retaining member 72 remains in the "down" position, shown in Fig. 3, and seals off the metered amount of mercury 60 in the metering orifice 96 before the metering orifice 96 leaves the body of the mercury 60. When the conveyor 50 has moved 180° in a clockwise direction, as viewed in Fig. 3, from the liquid loading position to the liquid unloading position, the metering orifice 96 is then in registry with the venting orifice 92 and the upper portion of the feeding orifice 94 in the retaining member 72 and the delivery orifice 76 in the mounting member 44 is in registry with the bottom portion of the feeding orifice 94, thus permitting the metered amount of mercury 60 contained in the metered orifice 96 to gravitationally roll down the feeding orifice 94 through the delivery orifice 76 and into the receiving chamber 74 of the mounting member 44. A blast of inert gas through the gas line 64 and inlet aperture 62 in the reservoir 56 and the gas inlet orifice 78 in the mounting member 44 moves the measured charge of mercury 60 through the bore of the flanged sleeve 40, and the tubulation 36 into the discharge device 38. Further, clockwise rotation, as viewed in Fig. 3, of the conveyor 50 moves the metering orifice 96 from the liquid unloading position to the liquid loading position, wherein the metering orifice 96 is once again in registry with the inlet orifices 90 of the retaining member 72 and the liquid feeding cycle is repeated.

Although a preferred embodiment has been disclosed it will be understood that modifications may be made within the spirit and scope of the invention.

I claim:

1. A liquid feeding apparatus comprising a reservoir adapted to contain a quantity of liquid, a mounting member fixedly mounted in a wall of said reservoir and provided with a delivery orifice, a metering member fixedly mounted on said mounting member and provided with a metering orifice, and a retaining member rotatably mounted on said mounting member and provided with an intake orifice and a feeding orifice, said metering orifice being movable into and out of said quantity of liquid and into and out of registry with said intake orifice to receive a measured quanttiy of liquid and also being movable into registry with said feeding orifice to feed said measured liquid through said delivery orifice.

2. A liquid feeding apparatus comprising a reservoir adapted to contain a quantity of liquid, a mounting member fixedly mounted in a wall of said reservoir and provided with a delivery orifice, a metering member fixedly mounted on said mounting member and provided with a metering orifice of predetermined volume, and a retaining member rotatably mounted on said mounting member and provided with an intake orifice and a feeding orifice, said metering member being movable to bring said metering orifice into and out of said quantity of liquid and into and out of registry with said intake orifice to receive a measured quantity of liquid and said metering member also being movable to bring said metering orifice into registry with said orifice to feed said measured liquid through said delivery orifice.

3. A liquid feeding apparatus comprising a reservoir within which a quantity of liquid is disposed, a mounting member fixedly mounted in a wall of said reservoir and provided with a delivery orfiice and a receiving chamber, a metering member fixedly mounted on said mounting member and provided with a metering orifice, and a retaining member rotatably mounted on said mounting member and provided with a first intake orifice, a venting orifice, a second intake orifice and a feeding orifice, said metering orifice being movable into and out of said quantity of liquid and into and out of registry with said intake orifices to receive a measured quantity of liquid and also being movable into registry with said feeding orifice and said venting orifice to feed said measured liquid through said delivery orifice into said chamber.

4. A liquid feeding apparatus comprising a reservoir within which a quantity of liquid is disposed, a mounting member removably mounted in a wall of said reservoir and provided with a delivery orifice and a receiving chamber, a metering member slidable onto and fixedly mounted on said mounting member and provided with a metering orifice, a retaining member rotatably mounted on said mounting member and provided with an intake orifice and a feeding orifice, said metering orifice being movable into and out of said quantity of liquid and into and out of registry with said intake orifice to receive a measured quantity of liquid and also being movable into registry with said feeding orifice and said venting orifice to feed said measured liquid through said delivery orifice into said chamber and means on said retaining member for maintaining said intake orifice in the liquid full position to seal off said measured quantity of liquid during movement of sad metering member out of said liquid.

5. A liquid feeding apparatus comprising a reservoir within which a quantity of liquid is disposed, a mounting member fixedly mounted in a wall of said reservoir and provided with a delivery orifice and a receiving chamber, a metering member fixedly mounted on said mounting member and provided with a metering orifice, a retaining member rotatably mounted on said mounting member and provided with a first intake orifice, a venting orifice, a second intake orifice and a feeding orifice, said metering orifice being movable into and out of said quantity of liquid and into and out of registry with said intake orifices to receive a measured quantity of liquid, and also being movable into registry with said feeding orifice and said venting orifice to feed said measured liquid into said chamber, means on said retaining member for maintaining said intake orifices in the liquid fill position to seal off said measured quantity of liquid during movement of said metering member and means for introducing said measured quantity of liquid into a discharge device.

6. A liquid feeding apparatus comprising a reservoir within which a quantity of liquid is disposed, a mounting member fixedly mounted in a wall of said reservoir and provided with a delivery chamber, a metering member fixedly mounted on said mounting member and provided with a metering orifice, a retaining member rotatably mounted on said mounting member and provided with an intake orifice and a venting orifice, and a second retaining member rotatably mounted on said mounting member and provided with a second intake orifice and a feeding orifice, said metering orifice being movable into and out of said quantity of liquid and into and out of registry with said intake orifices to receive a measured quantity of liquid and also being movable into registry with said feeding orifice and said venting orifice to feed said measured liquid into said chamber.

7. A liquid feeding apparatus comprising a reservoir within which a quantity of liquid is disposed, a mounting member fixedly mounted in a wall of said reservoir and provided with a delivery orifice and a receiving chamber, a metering member fixedly mounted on said mounting member and provided with a metering orifice, a retaining member rotatably mounted on said mounting member and provided with a first intake orifice, a venting orifice, a second intake orifice and a feeding orifice, said metering orifice being movable into and out of said quantity of liquid and into and out of registry with said intake orifices to receive a measured quantity of liquid and also being movable into registry with said feeding orifice and said venting orifice to feed said measured liquid through said delivery orifice into said chamber, means on said retaining member for maintaining said intake orifices in the liquid fill position and to seal off said measured quantity of liquid during movement of said metering member and means for introducing said measured quantity of liquid from said chamber into a liquid receiving device.

8. A mercury feeding apparatus comprising a reservoir within which a quantity of mercury is disposed, a mounting member fixedly mounted in a wall of said reservoir and provided with a delivery orifice and a receiving chamber, a metering member fixedly mounted on said mounting member and provided with a metering orifice, a retaining member rotatably mounted on said mounting member and provided with an intake orifice, a venting orifice, a second intake orifice and a feeding orifice, said metering orifice being movable into and out of said quantity of mercury and into and out of registry with said intake orifices to receive a measured quantity of mercury, and also being movable into registry with said venting orifice and said feeding orifice to feed said measured mercury through said discharge orifice into said chamber, means on said retaining member for maintaining said intake orifices in the mercury fill position to seal off said measured quantity of mercury during movement of said metering member and means for introducing said measured quantity of mercury from said chamber into a discharge device.

No references cited.